(12) United States Patent
Giddings et al.

(10) Patent No.: US 9,765,929 B2
(45) Date of Patent: Sep. 19, 2017

(54) COMPOSITE MATERIALS

(71) Applicant: CROMPTON TECHNOLOGY GROUP LIMITED, Banbury, Oxfordshire (GB)

(72) Inventors: Peter F. Giddings, Oxford (GB); Nicholas J. Henry, Woodford Halse (GB); Mohammed K. Riaz, Redditch (GB)

(73) Assignee: CROMPTON TECHNOLOGY GROUP LIMITED, Banbury Oxfordshire (GB)

( * ) Notice: Subject to any disclaimer, the term of this patent is extended or adjusted under 35 U.S.C. 154(b) by 201 days.

(21) Appl. No.: 14/496,351

(22) Filed: Sep. 25, 2014

(65) Prior Publication Data
US 2015/0083735 A1   Mar. 26, 2015

(30) Foreign Application Priority Data

Sep. 25, 2013  (EP) .................................. 13186016

(51) Int. Cl.
*B32B 37/14* (2006.01)
*F17C 1/02* (2006.01)
*B29C 53/58* (2006.01)
*B29C 53/60* (2006.01)

(52) U.S. Cl.
CPC .............. *F17C 1/02* (2013.01); *B29C 53/582* (2013.01); *B29C 53/602* (2013.01); *B32B 37/142* (2013.01)

(58) Field of Classification Search
CPC ....... B32B 37/142; F17C 1/02; B29C 53/582; B29C 53/602
USPC ................... 428/37, 35.7; 220/600; 156/185
See application file for complete search history.

(56) References Cited

FOREIGN PATENT DOCUMENTS

| DE | 4005772 A1 | | 9/1991 |
|---|---|---|---|
| DE | 10-2011080507 | * | 2/2013 |
| DE | 102011080507 A1 | | 2/2013 |
| WO | 2004007178 A1 | | 1/2004 |

OTHER PUBLICATIONS

European Search Report for Application No. 13186016.5-1706, Mailed on Mar. 3, 2014, 5 pages.

* cited by examiner

*Primary Examiner* — Yan Lan
(74) *Attorney, Agent, or Firm* — Cantor Colburn LLP

(57) ABSTRACT

A composite material comprises of at least first and second layers, each comprising a polymeric matrix material and wound tows for reinforcement. The tows are wound in opposite directions in each of the first and second layers such that overlapping tows form crossover regions. The wound tows in the second layer are arranged such that the crossover regions are formed to be laterally offset from the crossover regions in the first layer.

13 Claims, 2 Drawing Sheets

COMPOSITE MATERIALS

CROSS REFERENCE TO RELATED APPLICATIONS

This application claims priority to European Patent Application No. 13186016.5 filed Sep. 25, 2013, the entire contents of which is incorporated herein by reference.

TECHNICAL FIELD

The present disclosure relates to composite materials and methods of manufacturing composite materials. The present disclosure also includes pressure-containing components and fluid containers formed from composite materials, such as pressure vessels.

BACKGROUND

Composite materials are materials formed from a plurality of different constituent materials, in order to achieve preferable properties, such as increased strength and decreased weight. They are well known for use in structural components, particularly in situations where minimising weight is important, such as in automotive and motorsport industries. Many composite materials comprise fibre reinforcement in a polymeric matrix.

Cylindrical structures made of composite materials are commonly manufactured using filament winding techniques, in which filaments formed from a variety of materials (such as carbon, glass or aramid e.g. Kevlar fibres) are wound under tension around a mould at an angle appropriate to the application. A high winding angle (hoop winding) can provide resistance to internal or external pressure, whereas a low winding angle (helical or closed winding) can provide resistance to longitudinal bending and axial tension or compression. The wound filaments are embedded in a matrix, generally of polymer resin, which may be applied to the filaments before or after winding or embedded in the fibres (pre-impregnated). The resin matrix is then cured, typically being heat treated, in order to set the filaments in place. However, tubes formed by conventional filament winding techniques are highly permeable due to the nature of the material. Commonly used anhydride curing epoxy resins have a relatively high specific permeability making the resulting composites permeable to low molecular weight fluids. Furthermore, permeation rate increases as molecular weight of contained fluids decreases.

High pressure fluid storage is a growing sector in energy, automotive and aerospace markets with a focus on low molecular weight fluids such as hydrogen, nitrogen and helium of prime interest. Current pressure vessels used to store gases and fluids at high pressure are often made of steel and therefore are not weight optimised, reducing the practicality of their use in many situations. Composite materials are often used to reduce weight of pressure vessels or to allow elevated pressures compared to metallic alternatives. Due to the permeability of presently manufactured composites, composite pressure vessels must be rendered impermeable, for example by using metallic liners. However, use of discrete liners increases the weight of the vessel and can create a corrosion risk between dissimilar materials. It would therefore be desirable to remove the need for impermeable liners.

SUMMARY

From a first aspect of this disclosure there is provided a composite material comprising at least first and second layers each comprising a polymeric matrix material and wound tows for reinforcement, wherein the tows are wound in opposite directions in each of the first and second layers such that overlapping tows form crossover regions, wherein the wound tows in the second layer are arranged such that the crossover regions are formed to be laterally offset from the crossover regions in the first layer.

Thus in accordance with this disclosure, crossover regions formed from overlapping tows are arranged in the second layer such that they are not substantially aligned over the crossover regions in the first layer. This advantageously reduces the size of continuous regions of unreinforced matrix material, decreasing the permeability of the composite material. The matrix material is permeable to low molecular weight fluids so by covering the regions of unreinforced matrix material in one layer with the overlapping tows in another layer, the permeability of the material as a whole is reduced because there is no longer a continuous path for fluid molecules to penetrate through the matrix material from one layer to another.

It has been recognised that conventional helical winding techniques produce interweaving of filaments but the layers are laid down identically so that unreinforced resin pockets are present at the crossover regions. Regions of unreinforced matrix material can cause deformation of the composite material under pressure due to the reduced modulus of elasticity and failure strength of the matrix as compared to the reinforcing fibres. Blisters (in which the tows are pushed out by the increasing pressure) and cracks therefore appear on the surface of the material at locations where unreinforced matrix material is present, such localised damage can cause the composite to fail and contained fluid to escape. By offsetting or phasing the crossover regions between layers such that the regions of unreinforced matrix material are minimised, failure due to these problems is reduced. In a particular example, the crossover regions in the second layer are arranged such that they at least partially coincide with regions of unreinforced matrix material in the first layer. So as to minimise the risk of permeation, the crossover regions in the second layer may be arranged so as to be substantially aligned with regions of unreinforced matrix material in the first layer.

In a particular example, the composite material comprises a plurality of layers in which the crossover regions are arranged such that there are no crossover regions aligned between the layers. This may make the material substantially impermeable, as there would be no route through the composite material for fluid molecules to penetrate via the unreinforced matrix material. It will be understood that a region of unreinforced matrix material can be identified by the absence of a reinforcing tow.

While the tows are wound in opposite directions in each of the first and second layers, the layers may be wound at the same angle. But in a particular example the tows are wound at different angles in the first and second layers. This may increase the strength of the composite material as it provides strength in a plurality of different directions, for example combining hoop strength with axial strength. This helps to reinforce the composite material when it is pressurised, e.g. containing fluid under pressure, preventing it from expanding significantly under the applied stress. The tows in the first layer may be wound at a relatively low winding angle e.g. from 60° down to the minimum achievable wind angle (that may in most cases be approaching 8°), so that the first layer has fewer crossover regions where the matrix material is unreinforced. For example, the tows in the first layer may be wound at a winding angle of 60° or less, 50° or less, 40° or less, 30° or less, 20° or less, 10° or less, or around 8°. In these examples, the tows in the second layer may be wound at a relatively high winding angle e.g. ranging from more than 45° to the maximum achievable wind angle (that may in most cases approach 90°). For example, the tows in the second layer may be wound at a winding angle of more than 45°, 50°, 60°, 70°, 80°, 85°, or about 90°. The winding angle of this second layer is selected so that the second layer has increased hoop strength and stiffness. If the composite material is used as a pressure-retaining surface then the first layer may be arranged in contact with a pressurised fluid while the second layer is arranged on the outside.

In one example, the composite material consists of only two layers of wound tows i.e. the first and second layers, as this can minimise weight. In other examples, the composite material comprises more than two layers of wound tows. In third and optional further layers, the crossover regions are optionally formed to be laterally offset from those in an adjacent layer. This can further reduce the permeability of the composite material. It will be appreciated that each layer having a particular offset of the crossover regions may of course comprise multiple winding passes, e.g. at least two and up to dozens of passes per layer e.g. for larger structures. The number of winding passes per layer can vary as a function of material parameters, component geometry and desired composite architecture (such as layer thickness).

In one example, the second layer is made thicker than the first layer. The first layer may be kept relatively thin while the thickness of the second layer and any subsequent layers may be increased depending on the intended component application of the composite material. The first layer may, for example, be up to 1 or 2 mm thick, while the second layer may, for example, have a thickness ranging from 1 mm up to 10 or 20 mm, or even more.

In each layer, the overlap between tows may be minimised so as to reduce layer thickness. Additionally or alternatively, the tension of the wound tows may be adjusted in order to reduce layer thickness. By adjusting one or more of these properties, the height of the crossover regions formed may be reduced, impacting on the overall layer thickness.

Layer thickness is also impacted upon by the thickness of the tows being wound. In a particular example, the thickness of the tows is minimised. This reduces the size of the regions of unreinforced matrix material due to a smaller crossover region height. Fewer layers may therefore be needed to reduce the permeability of the material significantly, as the crossover regions which need blocking may be smaller.

In a particular example, the matrix material further comprises one or more particulates, for example microscopic or nanoscopic particulates. These may help to fill any otherwise unreinforced gaps formed in the matrix material in a layer, reducing the size of the regions of unreinforced matrix material. The particulate(s) may comprise a filler material such as carbon black or silica. The addition of particulates may also help to reduce the appearance of longitudinal cracks and increase interlaminar strength and toughness (i.e. preventing delamination) when the composite material is put under pressure.

The offset arrangement of the crossover regions may be used in any helical winding system in which crossover regions are formed from overlapping tows, for example in filament winding, automated fibre deposition or tape placement systems. Filament winding techniques may include hoop winding, helical winding, wet winding (in which the tows are impregnated with matrix material prior to winding), dry winding (in which tows are wound before a resin is injected under pressure), and tow-preg winding (in which pre-impregnated tows are used).

The tows used may vary depending on the winding technique used. Each tow may comprise one or more fibres or tapes of reinforcing material, such as plastic, carbon, glass or aramid e.g. Kevlar. Each tow may consist of a single reinforcing fibre or tape, or a bundle of fibres or tapes. For filament winding techniques, any form of reinforcing fibre may be used, for example carbon or glass. Alternatively, a tape may be used, for example thermoset or thermoplastic tape. Each layer may comprise tows made of one or more reinforcing materials. The tows in different layers may be made of the same or different reinforcing materials.

The matrix material may comprise a resin, for example chosen from epoxy resins, polyester resins, phenolic resins, Bis-Maleimids (BMI), polyether ether ketones (PEEK), poly ether ketone-ketones (PEKK), polyphenylene sulfides (PPS), etc.

From a second aspect, the present disclosure provides a method of manufacturing a composite material comprising at least first and second layers each comprising a polymeric matrix material and wound tows for reinforcement, the method comprising: winding the tows within each layer in opposite directions such that overlapping tows form a crossover region; and arranging the wound tows in the second layer such that the crossover regions are formed to be laterally offset from the crossover regions in the first layer.

The tows may be wound according to any helical winding system in which crossover regions are formed from overlapping tows, for example using filament winding, automated fibre deposition or tape placement systems. Winding therefore may comprise hoop winding, helical winding, wet winding, dry winding, and/or tow-preg winding. The tows may be wound separately, but in a set of examples one or more tows are wound simultaneously using one or more winding attachments concurrently. Winding may take place on a mandrel that is cylindrical, spherical, round, or any shape that does not have re-entrant curvature. The disclosed method may be used to manufacture substantially cylindrical components such as tubes, pipes, tanks or vessels. However the method is not limited to axis-symmetric structures: prismatic shapes and more complex parts such as T-joints and elbows may be wound on machines equipped with the appropriate number of degrees of freedom.

The present disclosure extends to a composite material manufactured according to the disclosed method.

The disclosed composite materials may be used to manufacture pressure-containing components, which may include e.g. pressure vessels and pressurised pipes. By reducing the permeability of the composite material, pressure vessels can be formed which are lighter in weight than at present, as they can be produced without the need for a discrete metallic or polymeric liner. These vessels may be used to hold low molecular weight fluids such as hydrogen, helium or nitrogen gas, hydraulic fluids, oils, etc. Such pressure vessels are typically described as Category 5 pressure vessels.

Other applications may include pipe lines, gas cylinders, motor casings, helicopter blades, storage tanks (for gasoline, oil, salts, corrosive fluids, water etc.).

BRIEF DESCRIPTION OF DRAWINGS

One or more non-limiting examples will now be described, with reference to the accompanying drawings, in which.

DETAILED DESCRIPTION

Figure 1A:
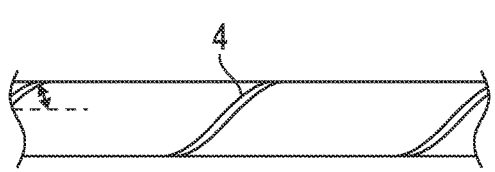
FIGS. 1a and 1b illustrate a first circuit of filament winding.
Figure 1B:
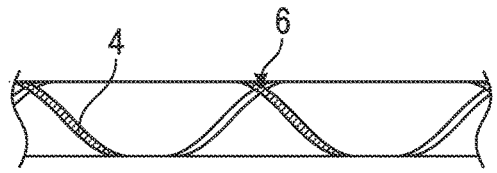
Figure 1C:
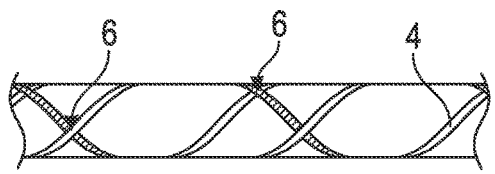
FIGS. 1c and 1d illustrate a second circuit of filament winding.
Figure 1D:
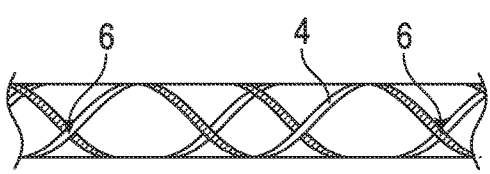

FIGS. 1a-1d illustrate a filament winding technique used in the formation of composite components. In this example the filament tows 4 are carbon fibres, impregnated with an epoxy resin containing carbon black particulates which forms the matrix material. However, the tows 4 may alternatively be different structural filaments or thermoset or thermoplastic tapes. The fibre tows 4 are shown to be wound at roughly 30°, but in practice they may be wound at an angle up to 90°, which is hoop winding, as this resists internal and external pressures. The winding angle may be selected depending on the structural strength that is required. In FIG. 1a, the tows 4 are wound in a helical pattern along the length of the desired tube or other cylindrical structure, before being reversed and wound back over themselves (FIG. 1b). This creates a crossing of the tows 4, which creates a number of raised crossing points 6. A crossover region 6 is formed where the two tows 4 overlap, causing a raised region of reinforcement. This causes there to be unreinforced resin pockets in the vicinity of the crossover region 6, which are permeable to low molecular weight fluids e.g. nitrogen gas. In FIGS. 1c and 1d, the winding of a second circuit is shown. Here, a second tow 4 is wound at the same angle, creating a second series of crossing points 6.

FIGS. 2a-2f demonstrate the progression of winding circuits to produce a layer 2 with full coverage. As additional winding circuits are added, gaps 5 in prior circuits are filled. This progresses from FIG. 2a to FIG. 2f, in which all gaps 5 in previous circuits have been filled and a layer 2 with full coverage is produced. The winding pattern produced will be dependent on the winding angle, as each circuit within a layer 2 is wound at the same angle. While a layer of full coverage may appear to be complete, it may still be porous. This is due to regions of unreinforced matrix material in the vicinity of crossing points 6.

Figure 2A:
FIGS. 2a-2f illustrate the progression of filament winding to produce a full layer of wound tows.
Figure 2B:
Figure 2C:
Figure 2D:
Figure 2E:
Figure 2F:
Figure 3:
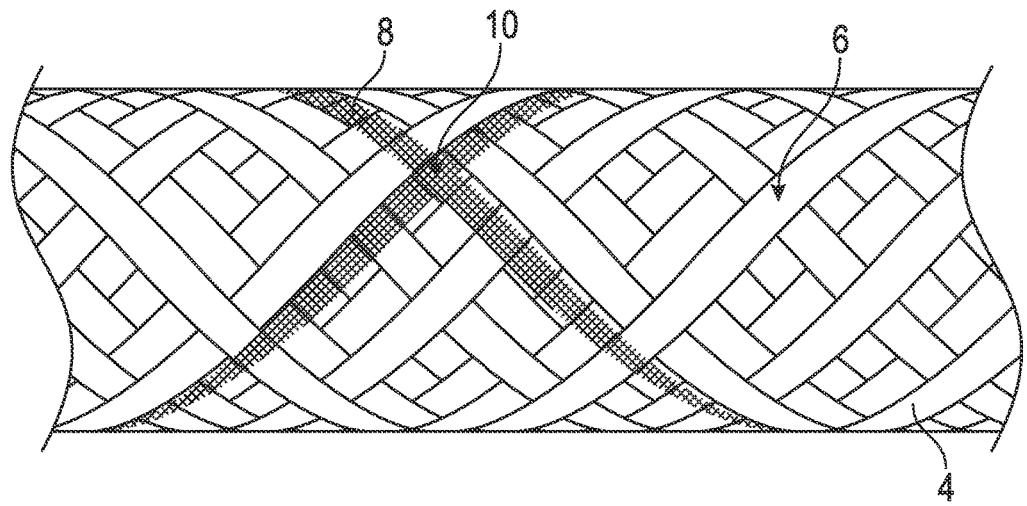
FIG. 3 illustrates an exemplary two-layered composite material with the crossover regions in an offset arrangement according to the present disclosure.

FIG. 3 illustrates an exemplary two-layered composite material according to the present disclosure, formed from the winding of a second layer over a first layer 2 as illustrated in FIG. 2f. In the second layer there are carbon fibre tows 8 wound over the first layer 2, shown here wound at the same angle as the tows 4 in the first layer 2, although this is not necessary. In the two layers the tows 4, 8 could be wound at different angles, which may be beneficial as the resulting composite material is then strengthened in two directions. The fibre tows 8 are arranged such that they form a crossover region 10 that does not sit directly over the crossover region 6; the crossover region 10 is instead offset from the crossover region 6 so that it sits over the position of an unreinforced resin pocket in the first layer 2. This is repeated throughout the material, minimising the regions of unreinforced resin and preventing alignment of unreinforced resin regions between the layers.

Figure 4:
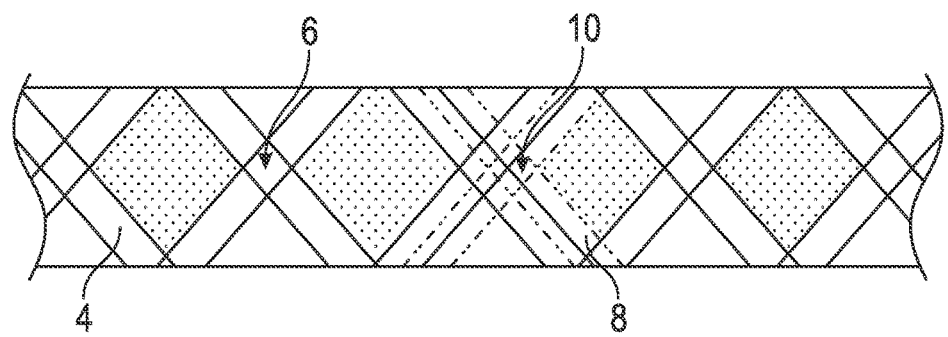
FIG. 4 illustrates an alternative view of an exemplary two-layered composite material with the crossover regions in an offset arrangement according to the present disclosure.

FIG. 4 shows an alternative illustration of the set up of FIG. 3. A schematic of the winding of the first layer 2 is shown, with the first circuit of tows 8 of the second layer wound on top. It can be seen that a crossover region 10 in the second layer is offset from a crossover region 6 in the first layer so as to be formed directly over an unreinforced resin pocket. The crossover region 10 in the second layer effectively 'fills in' the unreinforced area adjacent to the crossover region 6 in the first layer 2.

Figure 5:
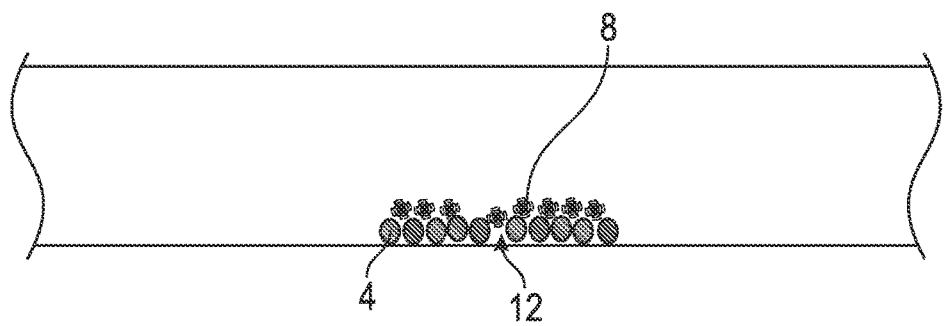
FIG. 5 illustrates a cross-sectional view of the arrangement of FIG. 4.

The offset or phased arrangement of crossover regions can be seen more clearly in FIG. 5. This is a sectional view of FIG. 4, in which the individual carbon fibre tows 4, 8 can be seen. The fibre tows 4 reinforce the first, lower layer 2. Due to the winding pattern in use, the fibre tows 4 do not form a continuous reinforcement, and a resin gap 12 is formed due to the overlap of fibres 4 at a crossover region 6. This gap is a pocket of unreinforced resin 12, which produces a weak point in the composite material potentially allowing permeation. However, when the second layer of fibres 8 is wound on top of the first layer 2, as the crossover regions 10 in the second layer are offset from the crossover regions 6 in the first layer the unreinforced resin gap 12 is covered, at least partially, by a fibre 8 in the second layer. The size of the unreinforced resin pocket 12 is therefore reduced and, in this example, the regions of unreinforced resin 12 are covered entirely. The degree to which unreinforced resin pockets 12 are covered may depend on the winding pattern, and can be adjusted to determine the degree of permeability in the resulting composite material. Minimum permeability of the composite may be achieved by placing the crossover regions 10 in the second layer 8 such that they are aligned directly over an unreinforced resin pocket 12 of the first layer 2, thus co-locating the thickest portion of the second layer with the unreinforced resin pocket 12 of the first layer 2. The offset between crossover regions 6, 10 may dictate the final permeability, depending on whether fluid molecules may still be able to pass through a path of unreinforced resin to penetrate the composite material.

This offset winding process can be repeated for a plurality of layers, with different layers having the same or different winding angles. However, the increased strength due to increased support directions will be offset by a heavier material, so the two properties must be balanced.

By layering the carbon fibre reinforcement with an offset as demonstrated in FIGS. 3 to 5, the permeability of the composite material produced is greatly decreased. This enables the composite to be used as a linerless pressure retention surface, e.g. in a pressure vessel or other pressure-containing component.

EXAMPLE 1

A pressure vessel was formed of a composite material according to this disclosure, and tested for containment of nitrogen gas at a pressure of 70 bar over a temperature range of 16 to 33° C. for 30 days. No permeation or consequential pressure drop was observed within the experimental measurement resolution (0.75 bar).

EXAMPLE 2

A pressure vessel was formed of a composite material according to this disclosure, and tested for containment of nitrogen gas/oil mix (e.g. hydraulic fluid) at a pressure of 150 bar over a temperature range of 16 to 33° C. for 25 days.

No permeation or consequential pressure drop was observed within the experimental measurement resolution (0.75 bar).

It will be understood that the description above is a description of a non-limiting example and that various changes and modifications may be made from the arrangement shown without departing from the scope of the disclosure, which is set forth in the accompanying claims.

The invention claimed is:

1. A composite material comprising:
    a first layer having full coverage and comprising a polymeric matrix material and wound tows for reinforcement, wherein the tows are wound in opposite directions such that overlapping tows form crossover regions and regions of unreinforced matrix material thereby result in the vicinity of the crossover regions;
    a second layer having full coverage and comprising a polymeric matrix material and wound tows for reinforcement, wherein the tows are wound in opposite directions such that overlapping tows form crossover regions and regions of unreinforced matrix material thereby result in the vicinity of the crossover regions,
    wherein the wound tows in the second layer are arranged such that the crossover regions are formed to be laterally offset from the crossover regions in the first layer.

2. A composite material according to claim 1, wherein the wound tows in the first and second layers are arranged such that there are no crossover regions aligned between the layers.

3. A composite material according to claim 1, wherein the crossover regions in the second layer are arranged so as to at least partially coincide with regions of unreinforced matrix material in the first layer.

4. A composite material according to claim 1, wherein the wound tows in the first and second layers are wound at the same angle.

5. A composite material according to claim 1, wherein the wound tows in the first and second layers are wound at different angles.

6. A composite material according to claim 5, wherein the wound tows in the first layer are wound at a lower winding angle than the wound tows in the second layer.

7. A composite material according to claim 1, comprising third and further layers.

8. A composite material according to claim 7, wherein crossover regions formed in the third and further layers are laterally offset from the crossover regions in an adjacent layer.

9. A composite material according to claim 1, wherein the matrix material further comprises one or more particulates.

10. A composite material according to claim 1, wherein the wound tows comprise one or more fibres or tapes of reinforcing material.

11. A composite material according to claim 10, wherein the reinforcing material is carbon.

12. A composite material according to claim 1, wherein one or more tows are wound simultaneously using one or more winding attachments concurrently.

13. A pressure vessel manufactured from a composite material according to claim 1.

* * * * *